United States Patent
Dolikian

[11] 4,175,256
[45] Nov. 20, 1979

[54] DYNAMIC THRESHOLD TONE DETECTOR

[75] Inventor: Arman V. Dolikian, Palatine, Ill.

[73] Assignee: Motorola, Inc., Schaumburg, Ill.

[21] Appl. No.: 710,766

[22] Filed: Jul. 30, 1976

[51] Int. Cl.$^2$ .............................................. H03K 5/20
[52] U.S. Cl. ................................... 328/149; 307/358; 329/179; 340/171 R
[58] Field of Search ................ 307/358; 328/146, 147, 328/148, 149, 167; 329/178, 179; 340/171 R

[56] References Cited

U.S. PATENT DOCUMENTS

| | | | |
|---|---|---|---|
| 2,952,811 | 9/1960 | Carr | 328/149 |
| 3,320,576 | 5/1967 | Dixon et al. | 340/171 R |
| 3,502,993 | 3/1970 | Schurzinger et al. | 307/235 J |
| 3,551,889 | 12/1970 | Miller | 340/171 R |
| 3,708,678 | 1/1973 | Kreda | 307/358 |
| 3,868,639 | 2/1975 | Okada et al. | 340/171 R |
| 3,882,402 | 5/1975 | Tajima et al. | 328/149 X |

OTHER PUBLICATIONS

Dynamic Threshold Circuit by Rackl, IBM Tech. Disclosure Bull., vol. 15, No. 4, Sep. 1972, p. 1138.

Primary Examiner—John S. Heyman
Attorney, Agent, or Firm—James W. Gillman; Victor Myer

[57] ABSTRACT

The presence of a tone in a received signal is detected by passing the signal through a bandpass filter tuned to the frequency of interest. The output from the filter is peak detected and applied both to the first input of a comparator and to a unique variable threshold circuit which, in turn, is coupled to the remaining comparator input. The threshold circuit tracks the peak detected level of the bandpass filter output such that the comparator is activated between its logic states, representing the detect or undetect condition, with a minimum of delay time.

7 Claims, 2 Drawing Figures

DYNAMIC THRESHOLD TONE DETECTOR

BACKGROUND OF THE INVENTION

The present invention pertains to the electronic communication art and, in particular, to an improved tone detector for use therein.

Tone detector systems have found extensive application, especially in the two-way communication art. There, for example, a dispatcher located at a central base station may wish to selectively communicate with one or more of several mobile units. Each mobile unit is assigned a particular tone code such that when the transmitted message from the dispatcher contains the appropriate subaudible tone the mobile realizes it is being addressed and processes the remainder of the message.

The heretofore dominant method of tone detecting has employed mechanical reeds which are tuned to the tones to be detected. The reeds have a high "Q" whereby when a received signal contains the resonant frequency the reed oscillates thereby notifying detector circuitry that the tone is present.

A particular problem with the reed type tone detectors has been that, due to its high Q the reed is slow to respond to a received tone and, once the tone ceases, the reed continues oscillating for a significant time interval. Thus, the total system throughput time is degraded by the reed delay times.

A particularly effective way to minimize reed turnoff time is described in U.S. Pat. No. 2,974,221 issued Mar. 7, 1961, invented by Robert Peth, and assigned to the same assignee of the present invention. There, each transmitting station includes circuitry which, upon the end of a transmitted message generates a reverse tone burst which, when received at the receiving station, significantly reduces the reed delay turnoff time. While the Peth invention has significantly improved reed type tone detectors, there has remained a long felt need for a tone detector system which minimizes both turn on and turn off detect times and does not require reverse tone burst generating circuitry.

SUMMARY OF THE INVENTION

It is an object of this invention, therefore, to provide an improved tone detector circuit which exhibits minimum turn on and turn off delay times.

It is a further object of the invention to provide the above described tone detector which does not require the use of specially transmitted signals, such as of the reverse burst type.

Briefly, according to the invention, the apparatus for detecting the presence of a tone of frequency f in a received signal includes a filter which comprises tuning circuitry tuned to the frequency f for processing the received signal and passing only those signals at or near said frequency. A detector responds to the filter means and produces a detect signal which is representative of the magnitude of the signal passed by the filter. The detector signal is coupled by appropriate means to the first input of a comparator, which has a second input and an output. The comparator output assumes either first or second logic states representative of a predetermined relationship between the relative magnitudes of signals that it receives at its input terminals. The apparatus further includes a dynamic threshold circuit which is responsive to the detect signal to couple an appropriate output to the second input of the comparator. The threshold circuit produces a first threshold signal having a magnitude such that the comparator output assumes its first logic state, corresponding to the undetect condition, in response to the detect signal being at or below a predetermined lower limit level. This first threshold signal magnitude is predeterminedly controlled such that the comparator output will be activated to the second logic state, or detect condition, in response to a predetermined increase in the detect signal. A second threshold signal is produced, by the dynamic threshold circuit, having a magnitude such that the comparator output assumes its second detect logic state in response to the detect signal being at or above a predetermined upper limit level. As with the first threshold level, the second threshold signal has a magnitude predeterminedly controlled such that the comparator output is activated to its first logic state in response to a predetermined decrease in the detect signal.

Due to the dynamic nature of the threshold circuit the inventive tone detector has greatly reduced turn on and turn off times without the need for a reverse burst or other type of transmitted signal.

DESCRIPTION OF THE PREFERRED EMBODIMENT OF THE INVENTION

Figure 1:
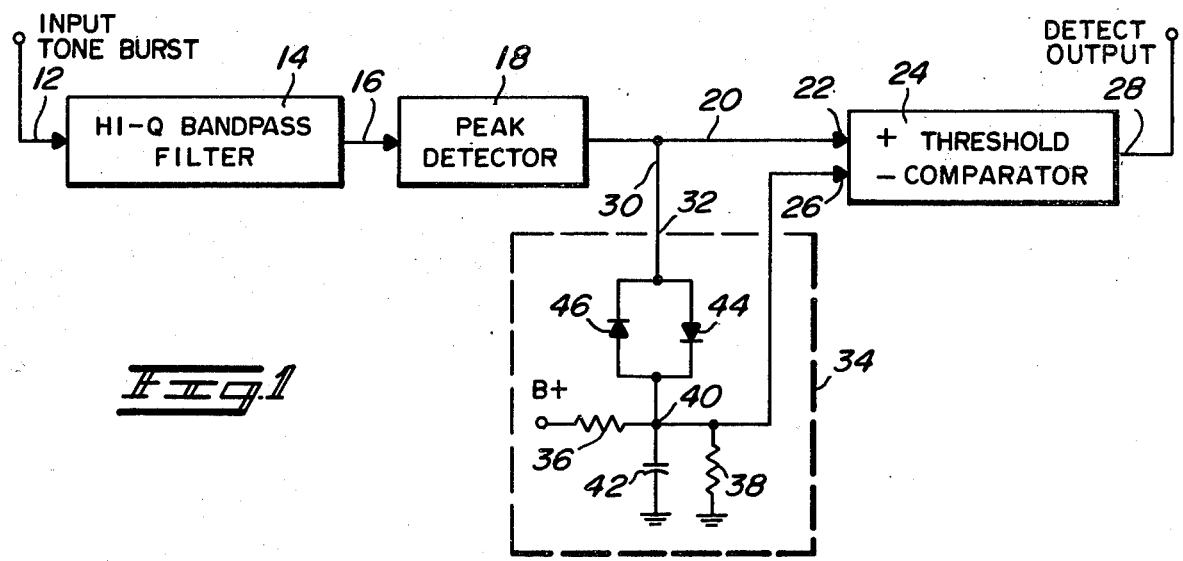
FIG. 1 is a schematic diagram illustrating a preferred construction of the improved tone detector.

Referring to FIG. 1, signals are received over an input line 12 which couples to prior processing circuitry (not shown). For example, the prior processing circuitry may be the receiver portion of a mobile transceiver which is responsive to a particular subaudible tone in a transmitted signal to indicate that it is being addressed. The received signals at line 12 are processed through a bandpass filter 14 which includes tuning circuitry tuned to the frequency f of the tone to be detected. The basic design characteristic of the bandpass filter 14 is that it have a high Q at the frequency f and, given that simple constraint, anyone of ordinary skill in the art could devise numerous passive, active, or other type circuits suitable to function as the bandpass filter 14.

The output of the bandpass filter 14 is fed via a line 16 to a peak detector circuit 18. Since the bandpass filter 14 passes only those signals having a frequency at or near the desired tone frequency f, its output contains essentially sinusoidal signals constrained to an envelope having a magnitude dependent upon the magnitude of a received tone signal. The peak detector acts in the known manner to produce a detect signal which is representative of the envelope magnitude of the signal passed by the filter means. In this preferred embodiment of the invention, the peak detector 18 may employ a half wave low pass filter comprised of a single diode followed by an RC single time constant network to produce an output signal having a magnitude proportional to the peak magnitude of the bandpass 14 passed signal.

The output from the peak detector 18 is fed over line 20 to the first input 22 of a threshold comparator 24 and over line 30 to the input terminal 32 of the dynamic threshold circuit 34. The comparator 24 has a second input 26 and an output terminal 28. Operating in the conventional manner, the comparator output 28 assumes either a high or a low logic state representative of the relative magnitude of the signals applied at its inputs 22, 26. In this preferred embodiment of the invention the comparator 24 is of the standard type wherein when the voltage at the first input 22 is less than the voltage at the second input the comparator assumes a low logic state, the comparator otherwise assuming a high logic state.

The threshold detector circuitry 34 is comprised of a resistive voltage divider comprised of first and second resistors 36, 38 which are connected between a source of direct current bias B+ and a reference or ground potential. The divider has a provided voltage tap 40 at the common connection of the two resistors 36, 38. Coupled between the tap 40 and ground potential is a capacitor 42 which is of a selected value tending to maintain the voltage across the resistor 38, the purpose for which being discussed more fully hereinbelow.

A pair of diodes 44, 46 are connected in parallel with opposite polarity and series connect via line 30 from the output of the peak detector 18 to the tap 40 of the voltage divider. The diodes 44, 46 are preferably of the silicon type having a reference turn on voltage of approximately 0.6 volts, and, as is more fully discussed hereinbelow, act to clamp the voltage at tap 40 of the resistive divider.

Figure 2:
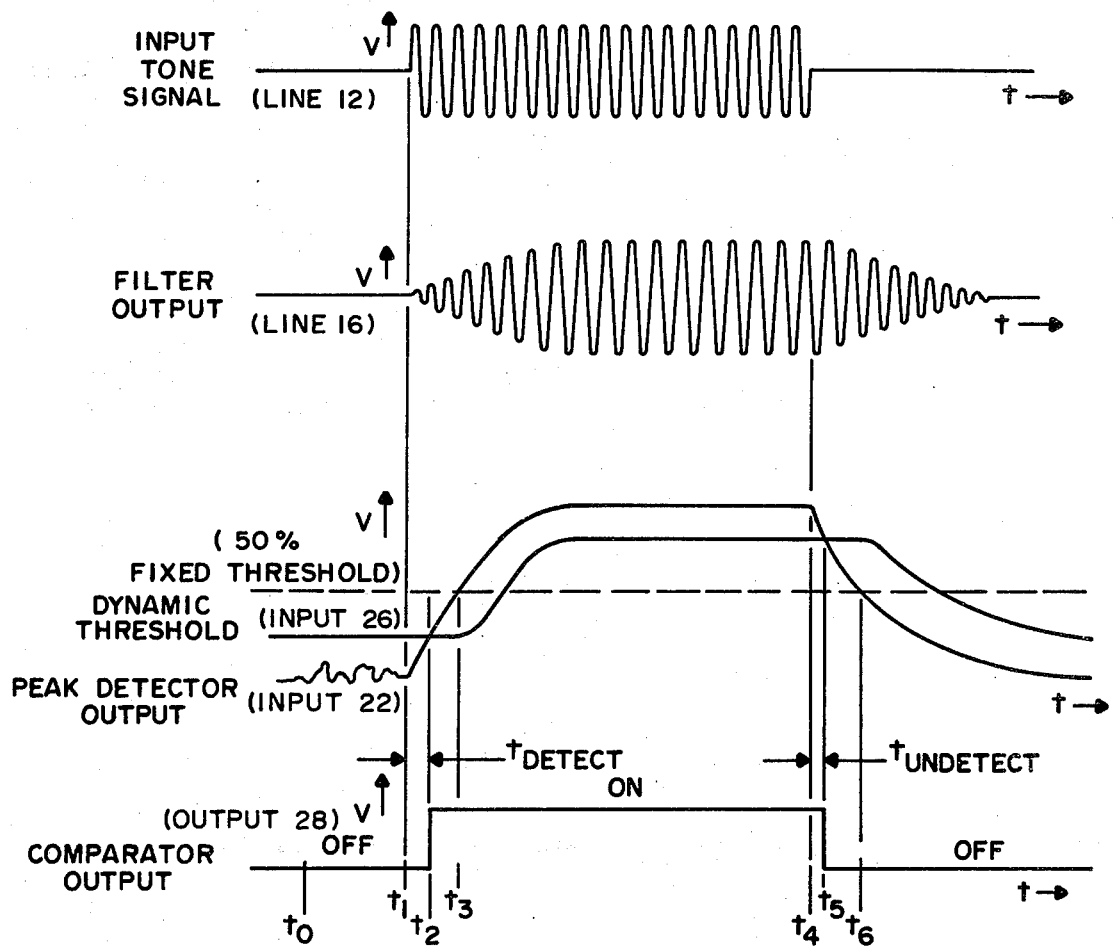
FIG. 2 includes a series of waveforms illustrating the operation of the improved tone detector in FIG. 1.

Operation of the tone detector may be best understood with reference to both FIGS. 1 and 2. A received signal on line 12 may include a reference tone burst having a frequency f. The received tone is passed to the bandpass filter 14 which is tuned to the desired frequency f. Due to the high Q nature of the bandpass filter 14 the output therefrom is a sinusoidal waveform having an increasing envelope which ultimately increases to the magnitude of the received tone burst. The peak detector 18 produces an output signal of rising magnitude corresponding to the signal passed by the bandpass filter 14.

In the absence of receiving a significant signal at or near the frequency f, the output from the peak detector 18 is at or near ground potential whereby the second diode 46 of the threshold detector 34 is biased to its active state via bias supply B+ and the first resistor 36 of the voltage divider. Thus, the voltage at the resistive divider tap 40 is clamped to the on voltage of the diode 46 which, for a silicon diode, is approximately 0.6 volts. Comparator 24 thus has a signal of approximately 0 volts at its first input 22 and a signal of approximately 0.6 volts at its second input 26 whereby its output 28 assumes a low logic level state corresponding to the undetect condition. For all detector 18 output signals below a predetermined lower limit level determined by the turn on and off potential of the diodes 44, 46 and the voltage maintained at resistive tap 40 the threshold detector 34 applies a threshold signal to the second input 26 of comparator 24 of a magnitude to maintain the comparator output 28 in its first logic state, corresponding to the undetect condition.

Assuming a tone burst is applied on the line 12, at time $t_1$, due to the high Q of the bandpass filter the output at line 16 has an exponentially increasing envelope, which is proportionally tracked by the output of peak detector 18. As soon as the output on line 30 of peak detector 18 rises diode 46 ceases conducting since the voltage at voltage divider tap 40 is maintained with its previous value via the action of the capacitor 42.

As the voltage from the peak detector 18 output continues to rise the voltage at the comparator first input 22 exceeds the voltage at its second input 26 whereby the comparator output 28 assumes its high logic state corresponding to the detected condition. The detect condition occurs at time $t_2$ and the detect delay time corresponds to the time interval $t_1$ to $t_2$. A continued increase in the peak detector 18 output causes diode 44 to conduct thereby increasing the voltage at tap 40, and thus causing the comparator second input 26 to assume a value of approximately 0.6 volts lower than that at the peak detector 18 output. Since the voltage at the comparator first input 22 remains greater than that at the second input 26 the comparator output 28 remains in its high logic state as long as the tone is present. Thus, for peak detector signals exceeding a predetermined upper limit level determined by the forward bias required by the clamping diodes 44, 46 and the voltage at the resistive tap 40. The threshold detect circuit 34 produces a second threshold signal having a magnitude such that the comparator output 28 is caused to assume its high or detect output state. Notice that if the second input 26 of the comparator were biased at a fixed threshold level, as if only the resistive divider comprised of resistors 36 and 38 were used, the detect signal would occur at time $t_3$, significantly later than the detect time $t_2$, provided by the dynamic action of the diodes 44, 46 and capacitor 42 acting upon the peak detector 18 output. Thus, the output from the detector 18 need only increase a predetermined incremental amount before the comparator output 28 assumes the detect state.

At time $t_4$ the tone burst ends and, thus, the envelope at the bandpass filter output, and at the peak detector output decays exponentially toward zero. This causes diode 44 to cease conducting since the capacitor 42 holds the voltage at resistive divider tap 40 at its previous value. At time $t_5$ the voltage at the comparator first input 22 falls below that of the voltage at the comparator second input 26 whereby the comparator output 28 assumes its low, or undetect state at time $t_5$. Again, if the comparator second input 26 were biased at a fixed threshold, the undetect condition would not have occurred until a significant later time $t_6$. This is because the threshold detector circuit 34 produced an output which, when applied to the threshold comparator second input 26, maintained an incrementally lower voltage thereat as compared with the voltage at the comparator first input 22. Thus, the peak detector 18 output need drop only a slight amount before the undetect state is assumed.

As the peak detector 18 output continues to decrease, the diode 46 begins to conduct thus pulling the voltage at the resistive divider tap 40 down whereby the voltage at the comparator second input 26 lags that at its first input 22 by the voltage drop across diode 46, approximately 0.6 volts. This prepares the circuit for a subsequent tone burst.

In summary, improved tone detector apparatus has been described which exhibits minimal delay times and which does not rely on a transmitted signal, such as a reverse burst signal, to minimize the delay.

While a preferred embodiment of the invention has been described in detail, it should be understood that many modifications and variations thereto are possible, all of which fall within the true spirit and scope of the invention.

I claim:

1. Apparatus for detecting the presence of a tone having a frequency f in a received signal comprising:

filter means including tuning circuitry tuned to the frequency f for processing the received signal and passing only those signals having a frequency at or near the frequency f;

detector means, responsive to the filter means, for producing a detecting signal representative of the magnitude of the filter means passed signals, the detect signal being at or near a reference level in response to the absence of a significant filter means passed signal;

comparator means having first and second inputs and an output, the output assuming a first logic state responsive to the signal received at its first input being less than the signal received at its second input, the comparator means output otherwise assuming a second logic state;

means for coupling the detect signal to the comparator means first input;

means for producing a dynamic threshold signal and applying the same to the comparator means second input, the dynamic threshold signal of predetermined magnitude such that when the detect signal is at or near the reference level the comparator output assumes the first state and that for a predetermined incremental increase in the detect signal the comparator means output assumes the second state, the threshold detect signal tracking further increases in the detect signal and lagging by an incremental amount such that for a predetermined incremental decrease in the detect signal the comparator means output assumes its first state, whereby the comparator output assuming the first state is representative of the undetect condition and the comparator output assuming the second state is representative of the detect condition; said means for producing a dynamic threshold signal comprises:

a bias supply having an output potential terminal and a reference potential terminal;

a resistive voltage divider connected between the output and reference potential terminals of the bias supply, the divider having an output tap for supplying a predeterminedly divided portion of the bias supply;

capacitor means coupled between the voltage divider tap and reference potential for tending to maintain the voltage thereacross;

means for coupling the resistive divider tap to the second input of the comparator means; and clamping means coupling between the detector means and the resistive divider for clamping the voltage at the tap of the divider to an incremental value above the reference terminal responsive to the detect signal being less than the predetermined lower level, the clamping means clamping the voltage at the tape of the divider to an incremental value below the output terminal responsive to the detect signal being above the predetermined upper level.

2. The apparatus of claim 1 wherein the detector means includes means for producing a detect signal having a magnitude at or near the reference potential responsive to a relatively low magnitude of the filter means passed signal and producing a detect signal having a magnitude at or near the output potential responsive to a relatively high magnitude filter means passed signal.

3. The apparatus of claim 2 wherein the clamping means comprises a pair of diodes, the diodes being connected in parallel and with opposite polarity, the diode pair being series connected between the output of the detector means and the divider tap.

4. Apparatus for detecting the presence of a tone having a frequency f in a received signal comprising:

filter means including tuning circuitry tuned to the frequency f for processing the received signal and passing only those signals having a frequency at or near the frequency f;

detector means, responsive to the filter means, for producing a detect signal representative of the magnitude of the filter means passed signals;

comparator means having first and second inputs and an output, the output assuming either a first or a second logic state representative of a predetermined relationship between the relative magnitudes of the signals received at its inputs;

means for coupling the detect signal to the comparator means first input; and a dynamic threshold circuit responsive to the detect signal and coupled to the comparator means second input for producing a first threshold signal of a magnitude such that the comparator means output assumes the first logic state responsive to the detect signal being at or below a predetermined lower limit level, the first threshold signal magnitude being predeterminedly controlled such that the comparator means output will be activated to the second logic state responsive to a predetermined increase in the detect signal, the dynamic threshold circuit producing a second threshold signal of a magnitude such that the comparator means output assumes the second logic state responsive to the detect signal being at or aove a predetermined upper limit level, the second threshold signal magnitude being predeterminedly controlled such that the comparator means output will be activated to the first logic state responsive to a predetermined decrease in the detect signal, said dynamic threshold circuit comprising, a bias supply having an output potential terminal and a reference potential terminal;

a resistive voltage divider connected between the output and reference potential terminals of the bias supply, the divider having an output tap for supplying a predeterminedly divided portion of the bias supply;

capacitor means coupled between the voltage divider tap and reference potential for tending to maintain the voltage thereacross;

means for coupling the resistive divider tap to the second input of the comparator means; and clamping means coupling between the detector means and the resistive divider for clamping the voltage at the tap of the divider to an incremental value above the reference terminal responsive to the detect signal being less than the predetermined lower level, the clamping means clamping the voltage at the tap of the divider to an incremental value below the output terminal responsive to the detect signal being above the predetermined upper level.

5. A signal processing means for monitoring a signal whose magnitude makes transitions between upper and lower levels, said transitions occurring at a predetermined maximum rate, the signal processing means comprising:

detector means producing a first or second indicating state, the first state being produced when the monitored signal is at or near its lower level, the second state being produced in response to the monitored signal increasing in magnitude by a predetermined incremental amount above said lower level, the detector means including means for tracking further monitor signal increases such that if said monitor signal decreases by a predetermined incremental amount the first indicating state is produced, said detector means further comprising, comparator means having first and second inputs and an output, the output assuming said first indicating state responsive to the signal received at its first input being less than the signal received at its second input, the comparator means output otherwise assuming said second indicating state;

means for coupling the monitored signal to the comparator means first input;

a threshold detect signal generator for applying a predetermined signal to said comparator means second input responsive to the status of the monitored signal;

said threshold detect signal generator comprising, a bias supply having an output potential terminal and a reference potential terminal;

resistive voltage divider connected between the output and reference potential terminals of the bias supply, the divider having an output tap for supplying a predeterminedly divided portion of the bias supply;

capacitor means coupled between the voltage divider tap and reference potential for tending to maintain the voltage thereacross;

means for coupling the resistive divider tap to the second input of the comparator means; and clamping means coupling the monitored signal to the resistive divider for clamping the voltage at the tap of the divider to an incremental value above the reference terminal responsibe to the monitored signal being less than said predetermined lower level, the clamping means clamping the voltage at the tap of the divider to an incremental value below the output terminal responsibe to the monitored signal making a transition to said upper level.

6. The apparatus of claim 5 wherein the threshold detect signal generator includes means for producing a threshold detect signal having a magnitude at or near the reference potential responsive to the monitored signal being at or near said lower level and producing a detect signal having a magnitude at or near the output potential responsive to the monitored signal being at or near said upper level.

7. The apparatus of claim 6 wherein the clamping means comprises a pair of diodes, the diodes being connected in parallel and with opposite polarity, the diode pair series connecting the monitored signal to the divider tap.

* * * * *